(No Model.)
W. BORROWE & J. LUMLEY.
APPARATUS FOR MANUFACTURING HEAT INSULATING MATERIAL.
No. 596,419. Patented Dec. 28, 1897.
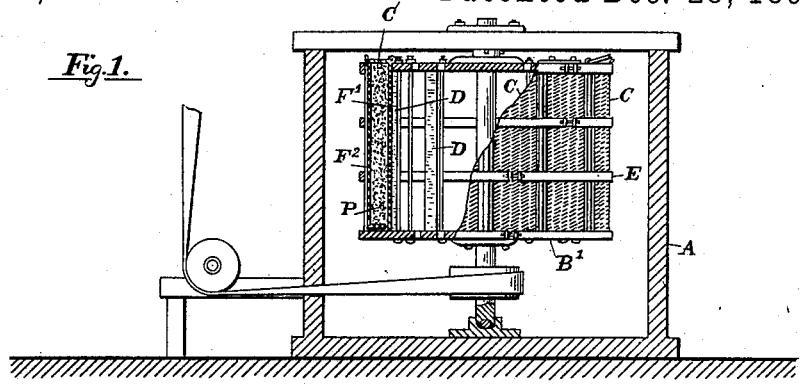
Fig. 1.
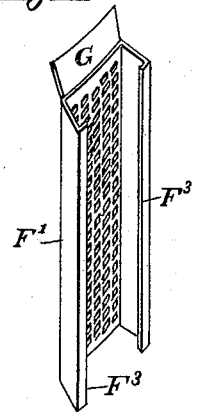
Fig. 3.
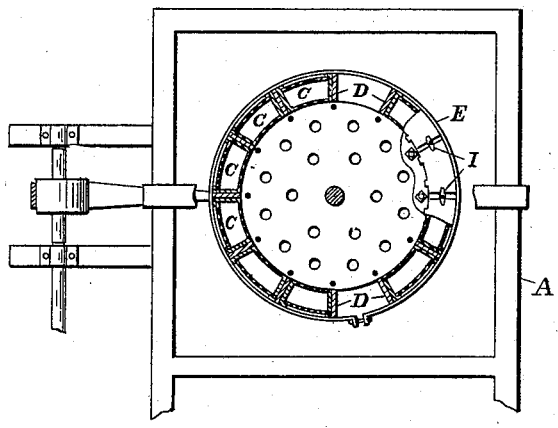
Fig. 2.
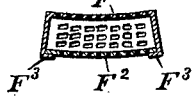
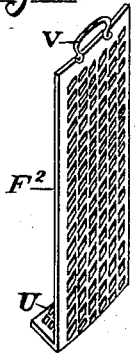
Fig. 4.
Fig. 5.
Witnesses
K. C. Nevins.
W. T. Grover.
Inventors
William Borrowe
John Lumley
By their Attorney
J. Richards
THE NORRIS PETERS CO., PHOTO-LITHO., WASHINGTON, D. C.

UNITED STATES PATENT OFFICE.

WILLIAM BORROWE AND JOHN LUMLEY, OF SAN FRANCISCO, CALIFORNIA.

APPARATUS FOR MANUFACTURING HEAT-INSULATING MATERIAL.

SPECIFICATION forming part of Letters Patent No. 596,419, dated December 28, 1897.

Application filed August 24, 1896. Serial No. 603,809. (No model.)

*To all whom it may concern:*

Be it known that we, WILLIAM BORROWE and JOHN LUMLEY, citizens of the United States, residing at San Francisco, county of San Francisco, and State of California, have invented certain new and useful Improvements in Apparatus for the Manufacture of Heat-Insulating Material; and we hereby declare the following to be a full, clear, and exact description of the same, reference being had to the accompanying drawings, forming a part of this specification.

Our invention relates to an apparatus for the manufacture of heat-insulating coverings that are molded and shaped when in a plastic condition, such as pipe-coverings, segments of circles, flat slabs, or any form required in the insulation of heat and to prevent its passage outward or inward from or to objects to be protected, and especially to the extraction of moisture and compacting or pressing such material.

Our improvements consist in various constructive and operative features, to be hereinafter more fully described, for placing the material in molds or forms perforated at one or more sides and mounting these molds or forms on rapidly-revolving wheels or in cylinders creating a high degree of centrifugal force, which, in connection with proper containing-molds, presses the plastic substance into form and at the same time extracts the moisture.

The objects of our invention are to effectually shape and press or compact the material in a rapid and practical manner and at the same time remove the moisture gradually as the material is condensed, thus shortening and cheapening the processes of manufacture, to attain a stiffness or stability of the various forms so they can be handled, also to shorten the time required for finally drying the material, which is very absorbent, being made from mineral substances—such as infusorial earth, magnesia, gypsum, and the like—in which is incorporated asbestos or vegetable fiber to impart cohesion. To mold this material into the various forms required, as is well known, it is mixed with water until of a plastic nature and then is poured or placed in matrices, where it is pressed to condense the mass, cause cohesion, and expel the moisture. Up to the point of molding our methods are the same as heretofore employed. Beyond that they are different, as will appear from the drawings now to be referred to.

Figure 1 is a side view, partially in section, of a machine employed for condensing and draining slabs or segments of insulating material. Fig. 2 is a plan view of the same machine, also partially in section. Fig. 3 is a view in perspective of one of the molds for segmental pieces with the front plate removed. Fig. 4 is a transverse section through one of the molds for segmental pieces. Fig. 5 shows the removable front plate of one of the segmental molds detached.

Similar letters of reference apply to like parts throughout.

Heat-insulating material is mainly for pipes and cylindrical vessels, consequently is of segmental form, either in slabs made to curves of different radius or in tubes, the latter being slit after completion, so as to be applied on pipes.

Referring first to the apparatus for making segmental slabs, (shown in Figs. 1 to 5,) A is the main frame of the condensing and drying or draining machine.

B' is a revolving cylindrical cage adapted to receive around its periphery a row of molds C, as seen in Fig. 2, and is driven by a band, as seen in Fig. 1, or in any other suitable manner.

The molds C are set in between radial partitions D, as seen in Fig. 2, and are sustained by strong hoops E against centrifugal force when the cylinder B' is in rapid motion.

The molds C are composed of two parts—an angular open-sided trough F', with a hinged cover G at the top, as shown in Fig. 3, and a removable front or outer plate F², provided with an angular extension U, that forms the bottom of the mold when the plate F² is inserted, as seen in section, Fig. 4. When the plate F² is inserted, the molds are in the form of open-ended boxes, as seen in Figs. 1 and 4, and can be poured full of the insulating material in a plastic state. These molds C are then set around the revolving frame or cylinder B', as seen in Fig. 2. The caps G are closed and held by the clamps I, and the cylinder B' being set in rapid motion the material is pressed outward against the plates $F^2$, and at the same time the contained water is drained off through the perforations in the plate $F^2$, leaving a compact slab H. The covers or caps G are then raised, and the plates $F^2$, by means of the handles V, are withdrawn with the slabs H, which latter are then compacted and stiff enough to be handled and removed to some suitable place for final drying, either in the sun or in a kiln. In this manner the pressing and draining are done in a rapid and efficient manner with simple apparatus.

The number of the cylinders or revolving frames B' are arranged to suit the extent of manufacture, preferably two or more, so that one can be filled while the others are in operation.

Having thus described our invention, its nature, objects, and manner of application, what we claim as new, and desire to secure by Letters Patent, is—

1. In an apparatus for the manufacture of heat-insulating coverings, the mold C, consisting of perforated open-sided trough F', hinged cover G, perforated removable front $F^2$, having perforated bottom extension U, and handle V, all substantially as specified.

2. In an apparatus for the manufacture of heat-insulating coverings, a revolving cage mounted on a vertical axis, and means for rotating the same, in combination with removable perforated separable molds, having hinged covers, adapted to be arranged and held about the periphery of said revolving cage, and rotated therewith to expel the moisture from the contained plastic coverings, substantially as specified.

3. In an apparatus for the manufacture of heat-insulating coverings, a revolving cylindrical cage B', mounted on a vertical axis, with means for rotating the same, said cage having radial partitions D, hoops E, and clamps I, in combination with molds C, consisting of perforated open-sided trough F', hinged cover G, and perforated removable front $F^2$, having perforated bottom extension U, substantially as specified.

In testimony whereof we have hereunto affixed our signatures in the presence of witnesses.

WILLIAM BORROWE.
JOHN LUMLEY.

Witnesses:
W. T. GROVER,
K. LOCKWOOD NEVINS.